United States Patent
Duan et al.

(10) Patent No.: US 11,977,301 B2
(45) Date of Patent: *May 7, 2024

(54) LIQUID CRYSTAL DISPLAY PANEL AND ELECTRONIC PAPER

(71) Applicants: Beijing BOE Optoelectronics Technology Co., Ltd., Beijing (CN); BOE Technology Group Co., Ltd., Beijing (CN)

(72) Inventors: Jinshuai Duan, Beijing (CN); Xiaojuan Wu, Beijing (CN); Hongliang Yuan, Beijing (CN); Wei Zhao, Beijing (CN); Yao Bi, Beijing (CN); Jiaxing Wang, Beijing (CN); Hao Yan, Beijing (CN); Li Tian, Beijing (CN); Liping Lei, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,749

(22) Filed: Mar. 31, 2023

(65) Prior Publication Data
US 2023/0236460 A1 Jul. 27, 2023

Related U.S. Application Data

(63) Continuation of application No. 17/498,367, filed on Oct. 11, 2021, now Pat. No. 11,650,462.

(30) Foreign Application Priority Data

Oct. 16, 2020 (CN) .......................... 202022318828.5

(51) Int. Cl.
*G02F 1/1339* (2006.01)
*G02F 1/1333* (2006.01)
(Continued)

(52) U.S. Cl.
CPC .... *G02F 1/13394* (2013.01); *G02F 1/133345* (2013.01); *G02F 1/13398* (2021.01);
(Continued)

(58) Field of Classification Search
CPC .......... G02F 1/13394; G02F 1/133345; G02F 1/13398; G02F 1/134309; G02F 1/13439;
(Continued)

(56) References Cited

U.S. PATENT DOCUMENTS

2007/0211202 A1 9/2007 Ishii et al.
2012/0092576 A1 4/2012 Nose
(Continued)

OTHER PUBLICATIONS

U.S. Appl. No. 17/498,367 Non-final office Action dated Oct. 4, 2022.
(Continued)

*Primary Examiner* — Mariam Qureshi
(74) *Attorney, Agent, or Firm* — IPro, PLLC

(57) ABSTRACT

A liquid crystal display panel is provided. The liquid crystal display panel includes: a first substrate and a second substrate arranged opposite to each other, and a liquid crystal layer and a plurality of strip-shaped spacers disposed between the first substrate and the second substrate. In the liquid crystal display panel, there is an overlapping area between an orthographic projection of a first signal line on a target base and an orthographic projection of a second signal line on the target base, and an orthographic projection of the strip-shaped spacer on the target base is not overlapped with the overlapping area.

20 Claims, 8 Drawing Sheets

(51) Int. Cl.
*G02F 1/1343* (2006.01)
*G02F 1/1362* (2006.01)

(52) U.S. Cl.
CPC .... *G02F 1/134309* (2013.01); *G02F 1/13439* (2013.01); *G02F 1/136209* (2013.01); *G02F 1/136286* (2013.01)

(58) Field of Classification Search
CPC ......... G02F 1/136209; G02F 1/136286; G02F 1/1339; G02F 1/0107; G02F 1/13396; H01J 9/242; H01J 11/36; H01J 2211/36; H01J 2217/49271; G09G 2300/0809; H01L 27/1251
See application file for complete search history.

(56) References Cited

U.S. PATENT DOCUMENTS

2012/0098420 A1   4/2012  Uchida et al.
2020/0159057 A1*  5/2020  Park .................... G02F 1/13394

OTHER PUBLICATIONS

U.S. Appl. No. 17/498,367 Notice of allowance dated Jan. 19, 2023.

\* cited by examiner

LIQUID CRYSTAL DISPLAY PANEL AND ELECTRONIC PAPER

CROSS REFERENCE TO RELATED APPLICATION

This application is a continuation application of U.S. application Ser. No. 17/498,367, filed on Oct. 11, 2021, which is incorporated herein by reference in its entirety.

TECHNICAL FIELD

The present disclosure relates to the field of display technologies, and more particularly to a liquid crystal display panel and an electronic paper.

BACKGROUND

A liquid crystal display panel is a common display panel. It has advantages of a lower manufacturing cost and a simpler manufacturing process, and thus has occupied a larger market share in the field of display technologies.

SUMMARY

Embodiments of the present disclosure provide a liquid crystal display panel and an electronic paper. The technical solutions are as follows.

In an aspect of the present disclosure, a liquid crystal display panel is provided. The liquid crystal display panel includes a plurality of first signal lines and a plurality of second signal lines, wherein the plurality of first signal lines and the plurality of second signal lines are arranged to intersect, the plurality of first signal lines and the plurality of second signal lines are configured to define a plurality of sub-pixel regions on the liquid crystal display panel, and the sub-pixel region includes four boundaries; and the liquid crystal display panel includes: a first substrate and a second substrate disposed opposite to each other, and a liquid crystal layer and a plurality of strip-shaped spacers disposed between the first substrate and the second substrate, the strip-shaped spacer extending along one boundary of the sub-pixel region, wherein there is an overlapping area between an orthographic projection of the first signal line on a target base and an orthographic projection of the second signal line on the target base, an orthographic projection of the strip-shaped spacer on the target base is not overlapped with the overlapping area, and the target base is a base of one of the first substrate and the second substrate.

Optionally, the plurality of strip-shaped spacers includes, four strip-shaped spacers corresponding to the four boundaries of the sub-pixel region, and the strip-shaped spacer extends along a corresponding boundary of the sub-pixel region.

Optionally, one strip-shaped spacer is disposed between any two adjacent sub-pixel regions.

Optionally, a length of the strip-shaped spacer ranges from one-third to one-half of a length of the corresponding boundary of the sub-pixel region.

Optionally, the liquid crystal display panel further includes a sealant frame and a strip-shaped barrier disposed between the first substrate and the second substrate, wherein the sealant frame includes a liquid crystal inlet, the strip-shaped barrier, the liquid crystal layer and the strip-shaped spacer are all disposed in an area enclosed by the sealant frame, and the strip-shaped barrier is disposed close to the liquid crystal inlet.

Optionally, the liquid crystal display panel further includes: a sealing strip connected to the sealant frame, and the sealing strip is configured to seal the liquid crystal inlet.

Optionally, an extending direction of the strip-shaped barrier is parallel to an opening surface of the liquid crystal inlet.

Optionally, an extending length of the strip-shaped barrier is less than a width of the liquid crystal inlet.

Optionally, the strip-shaped barrier and the strip-shaped spacer are arranged in a same layer and made of a same material.

Optionally, one of the first substrate and the second substrate includes a black matrix, and the orthographic projection of the strip-shaped spacer on the target base is within an orthographic projection of the black matrix on the target base.

Optionally, the strip-shaped spacer is fixedly connected to the substrate including the black matrix.

Optionally, the first substrate includes, a first base, and the plurality of first signal lines, a first insulating layer and a plurality of first strip-shaped electrodes disposed on the first base and stacked in a direction perpendicular to and going away from the first base, wherein the plurality of first signal lines are electrically connected in one-to-one correspondence to the plurality of first strip-shaped electrodes, and an extending direction of the first signal line is parallel to an extending direction of a corresponding first strip-shaped electrode.

Optionally, the first signal line includes a plurality of first connecting portions, the first insulating layer includes a plurality of first vias in one-to-one correspondence with the plurality of first connecting portions, and the first connecting portion is electrically connected to a corresponding first strip-shaped electrode through a corresponding first via.

Optionally, the second substrate includes: a second base, and the plurality of second signal lines, a second insulating layer and a plurality of second strip-shaped electrodes disposed on the second base and stacked in a direction perpendicular to and going away from the second base, wherein the plurality of second signal lines are electrically connected in one-to-one correspondence to the plurality of second strip-shaped electrodes, and an extending direction of the second signal line is parallel to an extending direction of a corresponding second strip-shaped electrode.

Optionally, the second signal line includes a plurality of second connecting portions, the second insulating layer includes a plurality of second vias in one-to-one correspondence with the plurality of second connecting portions, and the second connecting portion is electrically connected to a corresponding second strip-shaped electrode through a corresponding second via.

Optionally, the extending direction of the first strip-shaped electrode is perpendicular to the extending direction of the second strip-shaped electrode.

Optionally, the liquid crystal layer includes: bistable cholesteric liquid crystal molecules.

In another aspect of the present disclosure, a liquid crystal display panel is provided. The liquid crystal display panel includes: a first substrate and a second substrate disposed opposite to each other; and a liquid crystal layer, a sealant frame, and a strip-shaped barrier disposed between the first substrate and the second substrate, wherein the sealant frame includes a liquid crystal inlet, the liquid crystal layer and the strip-shaped barrier are disposed in an area enclosed by the sealant frame, and the strip-shaped barrier is disposed close to the liquid crystal inlet.

Optionally, the liquid crystal display panel further includes: a sealing strip connected to the sealant frame, and the sealing strip is configured to seal the liquid crystal inlet.

In yet another aspect of the present disclosure, an electronic paper is provided. The electronic paper includes: a power supply component and a liquid crystal display panel. The power supply component being configured to supply power to the liquid crystal display panel, and the liquid crystal display panel includes a plurality of first signal lines and a plurality of second signal lines, wherein the plurality of first signal lines and the plurality of second signal lines are arranged to intersect, the plurality of first signal lines and the plurality of second signal lines are configured to define a plurality of sub-pixel regions on the liquid crystal display panel, and the sub-pixel region has four boundaries; and the liquid crystal display panel includes: a first substrate and a second substrate disposed opposite to each other; and a liquid crystal layer and a plurality of strip-shaped spacers disposed between the first substrate and the second substrate, the strip-shaped spacer extending along one boundary of the sub-pixel region, wherein there is an overlapping area between an orthographic projection of the first signal line on a target base and an orthographic projection of the second signal line on the target base, an orthographic projection of the strip-shaped spacer on the target base is not overlapped with the overlapping area, and the target base is a base of one of the first substrate and the second substrate.

DETAILED DESCRIPTION

In order to make the purpose, technical solutions, and advantages of the present disclosure clearer, the embodiments of the present disclosure will be described in detail below with reference to the accompanying drawings.

Figure 1:
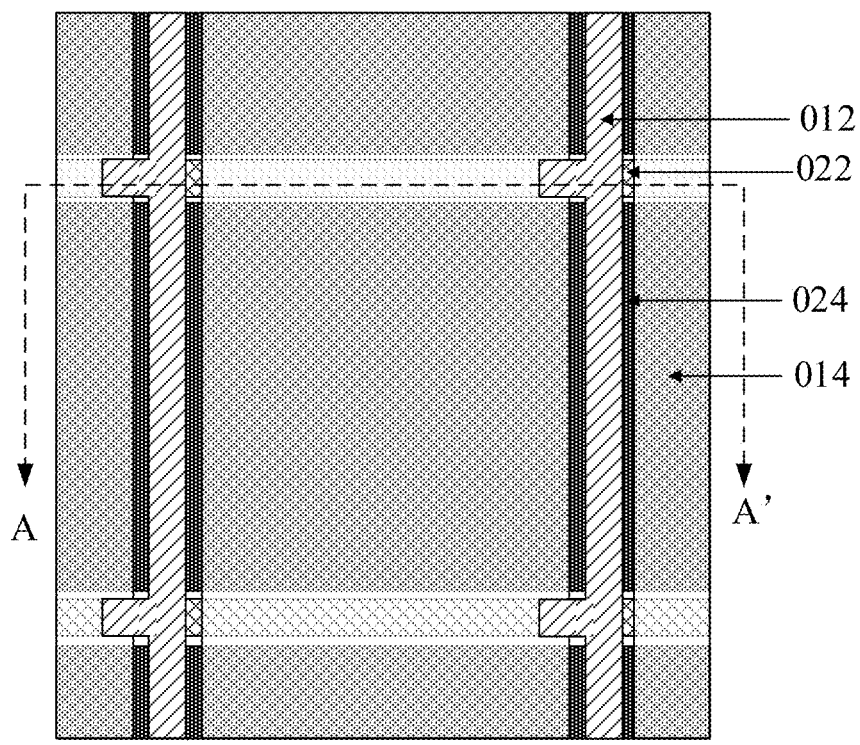
FIG. 1 is a top view of a liquid crystal display panel in the related art.
Figure 2:
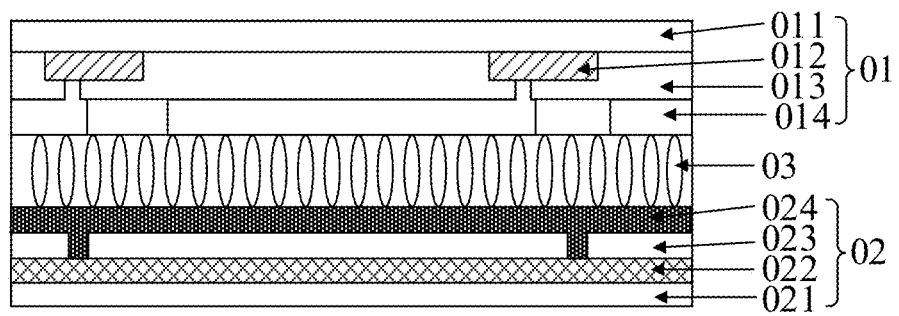
FIG. 2 is a cross-sectional view at A-A' of the liquid crystal display panel shown in FIG. 1.

Referring to FIG. 1 and FIG. 2, FIG. 1 is a top view of a liquid crystal display panel in the related art, and FIG. 2 is a cross-sectional view at A-A' of the liquid crystal display panel shown in FIG. 1. The liquid crystal display panel 00 may include a first substrate 01 and a second substrate 02 disposed opposite to each other, and a liquid crystal layer 03 disposed between the first substrate 01 and the second substrate 02.

The first substrate 01 may include: a first base 011, and a plurality of first signal lines 012, a first insulating layer 013 and a plurality of first strip-shaped electrodes 014 disposed on the first base 011 and stacked in a direction perpendicular to and going away from the first base 011. The plurality of first signal lines 012 are electrically connected in one-to-one correspondence to the plurality of first strip-shaped electrodes 014.

The second substrate 02 may include: a second base 021, and a plurality of second signal lines 022, a second insulating layer 023 and a plurality of second strip-shaped electrodes 024 disposed on the second base 021 and stacked in a direction perpendicular to and going away from the second base 021. The plurality of second signal lines 022 are electrically connected in one-to-one correspondence to the plurality of second strip-shaped electrodes 024.

The extending direction of the first strip-shaped electrode 014 is perpendicular to the extending direction of the second strip-shaped electrode 024.

The liquid crystal layer between the first substrate 01 and the second substrate 02 is composed of regularly arranged liquid crystal molecules. However, since the liquid crystal molecules in the liquid crystal layer 03 are relatively sensitive to external pressure, when the liquid crystal display panel is pressed, the arrangement of the liquid crystal molecules in the liquid crystal display panel is be affected, which results in a poor display effect of the liquid crystal display panel.

For example, in a scenario, in order to reduce power consumption of the liquid crystal display panel, bistable cholesteric liquid crystal molecules with reflective performance may usually be employed to form the liquid crystal layer 03. In this way, the liquid crystal display panel does not need a backlight, and can achieve a display function only through reflection of ambient light by the bistable cholesteric liquid crystal molecules. However, the bistable cholesteric liquid crystal molecules are extremely sensitive to external pressure. If the liquid crystal display panel is pressed with excessive external pressure, the bistable cholesteric liquid crystal molecules in the liquid crystal display panel tend to be arranged in a planar state, and the arrangement of liquid crystal molecules in the liquid crystal layer 03 is destroyed, resulting in a poor display effect of the liquid crystal display panel.

Therefore, in order to avoid the phenomenon that the arrangement of the liquid crystal molecules in the liquid crystal layer 03 changes when the display panel is pressed with large external pressure, a spacer may be provided between the first substrate 01 and the second substrate 02. The spacer may offset a part of the external pressure applied to the liquid crystal display panel, thereby reducing the probability that the arrangement of the liquid crystal molecules changes.

Figure 3:
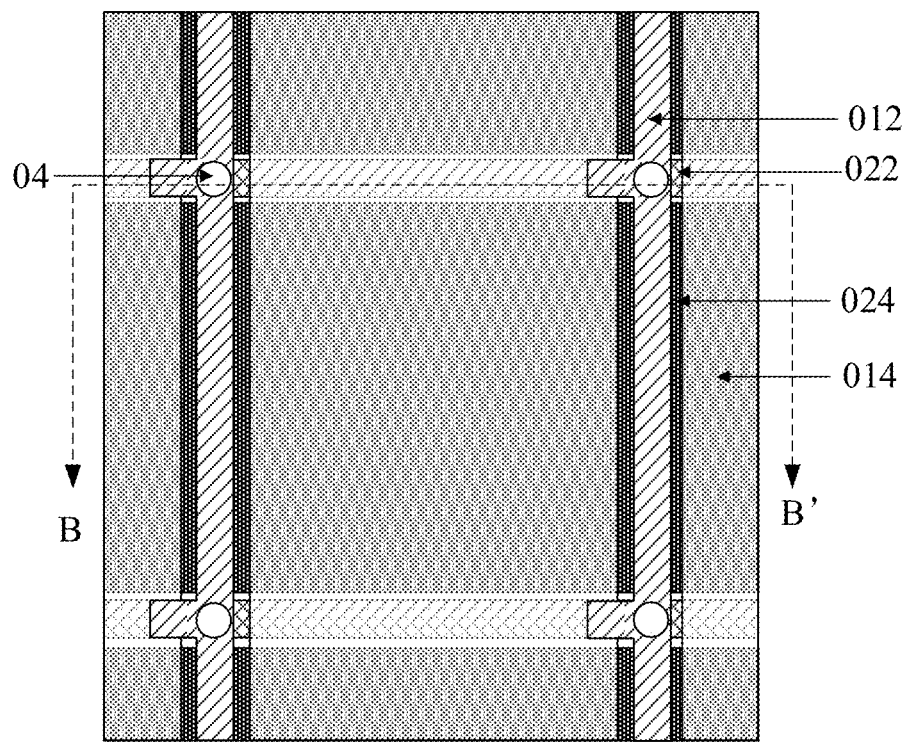
FIG. 3 is a top view of another liquid crystal display panel in the related art.
Figure 4:
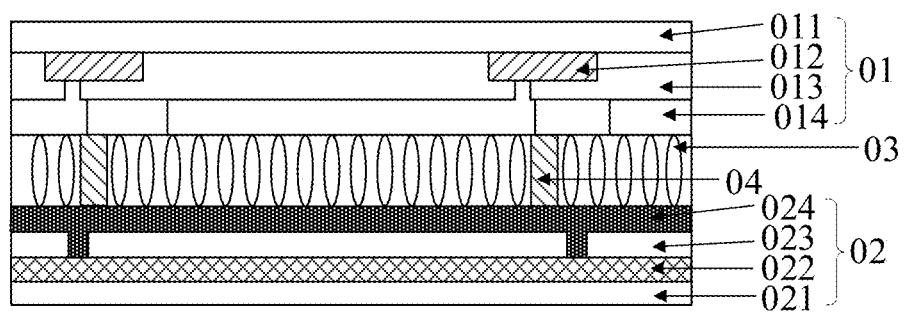
FIG. 4 is a cross-sectional view at B-B' of the liquid crystal display panel shown in FIG. 3.

For example, referring to FIG. 3 and FIG. 4, FIG. 3 is a top view of another liquid crystal display panel in the related art, and FIG. 4 is a cross-sectional view at B-B' of the liquid crystal display panel shown in FIG. 3. The shape of an orthographic projection of the spacer 04 disposed between the first substrate 01 and the second substrate 02 on a target base (the target base may be the first base 011 or the second base 021) is circular, and the orthographic projection of the spacer 04 on the target base overlaps with an orthographic projection of the first signal line 012 on the target base and an orthographic projection of the second signal line 022 on the target base. In this case, in order to prevent the pixel aperture ratio from being reduced by the spacer 04 and prevent the contrast and reflectivity of the liquid crystal display panel from decreasing, the area of the orthographic projection of the spacer 04 on the target base should not be too large. However, when the area of the orthographic projection of the spacer 04 on the target base is small, the contact area between the spacer 04 and the first substrate 01, and the contact area between the spacer 04 and the second substrate 02 are small. Therefore, the effect of supporting the first substrate 01 and the second substrate 02 by the spacer 04 is poor, and the liquid crystal molecules are still susceptible to external pressure.

Figure 5:
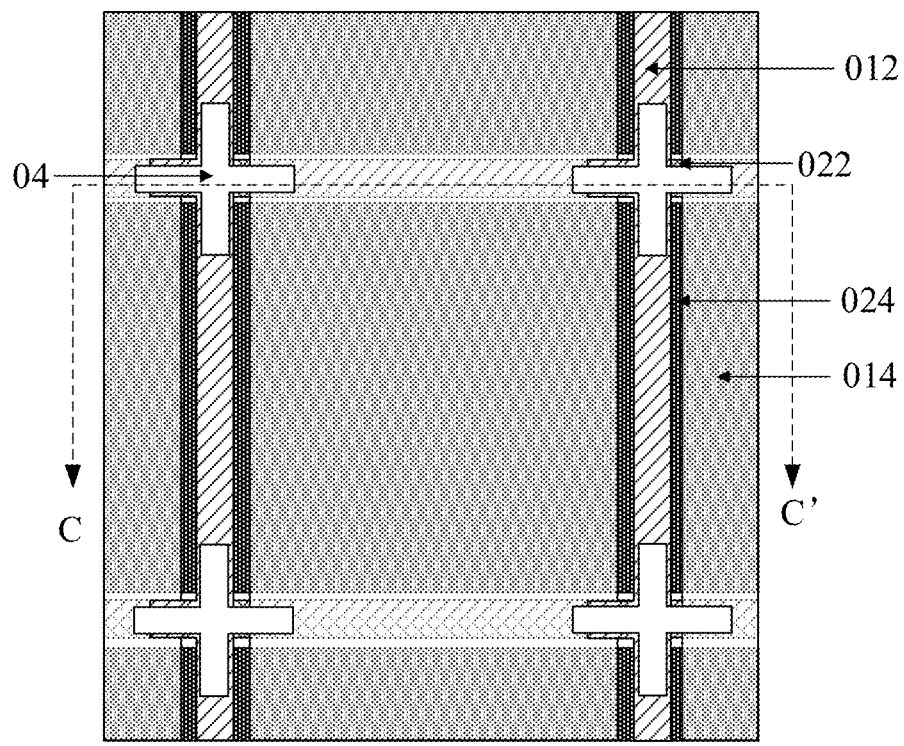
FIG. 5 is a top view of yet another liquid crystal display panel in the related art.
Figure 6:
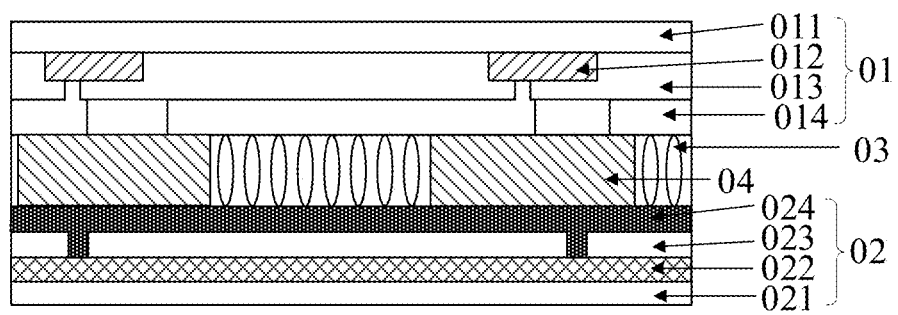
FIG. 6 is a cross-sectional view at C-C' of the liquid crystal display panel shown in FIG. 5.

In order to increase the contact area between the spacer 04 and the first substrate 01, and the contact area between the spacer 04 and the second substrate 02, another liquid crystal display panel is provided in the related art. As shown in FIG. 5 and FIG. 6, FIG. 5 is a top view of another liquid crystal display panel in the related art, and FIG. 6 is a cross-sectional view at C-C' of the liquid crystal display panel shown in FIG. 5. The shape of the orthographic projection of the spacer 04 disposed between the first substrate 01 and the second substrate 02 on the target base is a cross shape, a part of the orthographic projection of the spacer 04 on the target base overlaps with both of the orthographic projections of the first signal line 012 and the second signal line 022 on the target base, and a part of the orthographic projection of the spacer 04 on the target base overlaps with the orthographic projection of only one of the first signal line 012 and the second signal line 022 on the target base. In this case, the contact area between the spacer 04 and the first substrate 01 and the contact area between the spacer 04 and the second substrate 02 may be increased without affecting the pixel aperture ratio. However, since a part of the orthographic projection of the spacer 04 on the target base overlaps with both of the orthographic projections of the first signal line 012 and the second signal line 022 on the target base, while a part of the orthographic projection of the spacer 04 on the target base overlaps with the orthographic projection of only one of the first signal line 012 and the second signal line 022 on the target base, the thickness of the spacer 04 between the two substrates is not uniform, the effect of supporting the first substrate 01 and the second substrate 02 by spacer 04 is still poor, and the liquid crystal molecules are still susceptible to external pressure.

Figure 7:
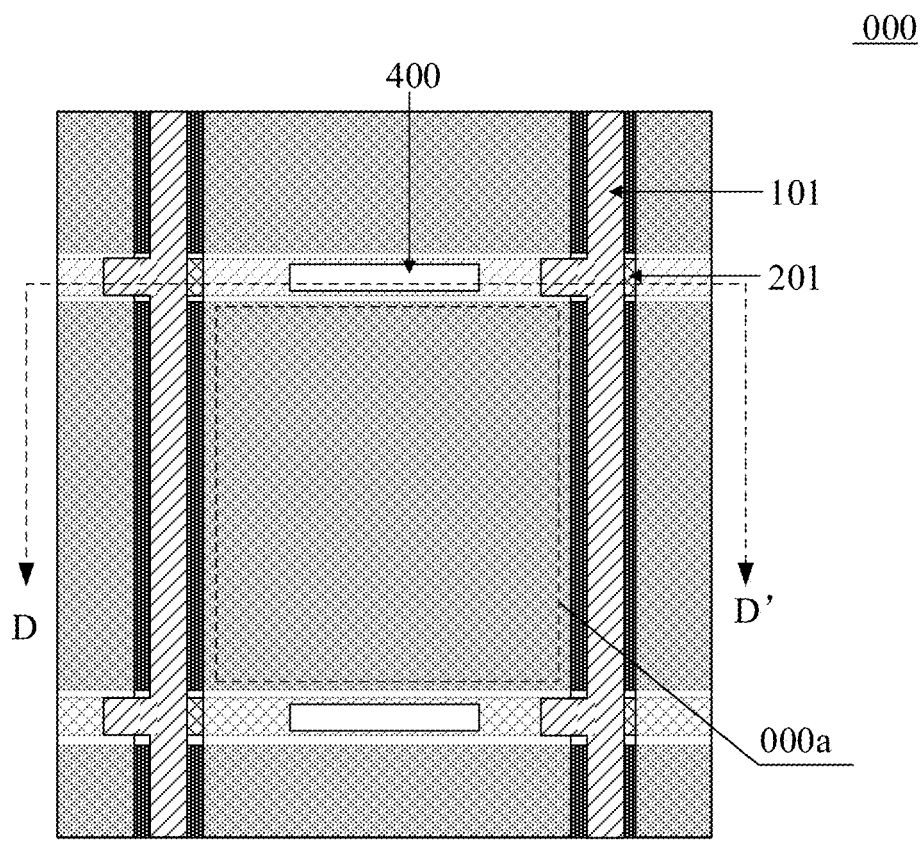
FIG. 7 is a top view of a liquid crystal display panel according to an embodiment of the present disclosure.
Figure 8:
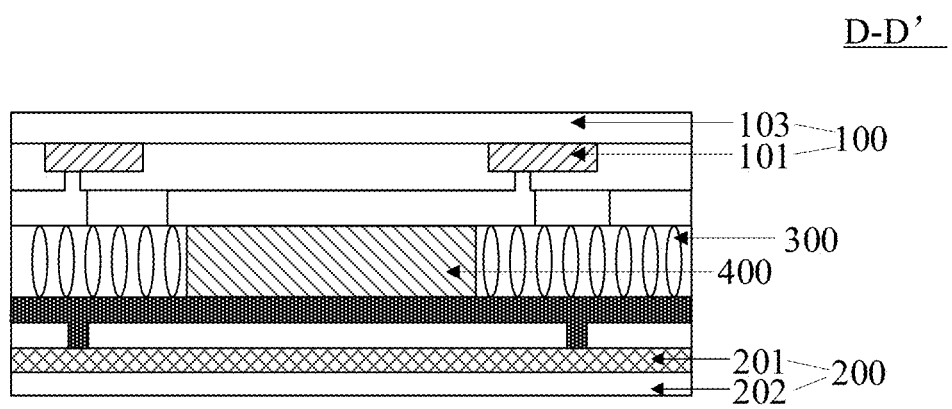
FIG. 8 is a cross-sectional view at D-D' of the liquid crystal display panel shown in FIG. 7.

Referring to FIG. 7 and FIG. 8, FIG. 7 is a top view of a liquid crystal display panel according to an embodiment of the present disclosure, and FIG. 8 is a cross-sectional view at D-D' of the liquid crystal display panel shown in FIG. 7. The liquid crystal display panel 000 includes a plurality of first signal lines 101 and a plurality of second signal lines 201, and the plurality of first signal lines 101 and the plurality of second signal lines 201 are arranged to intersect. The plurality of first signal lines 101 and the plurality of second signal lines 201 are configured to define a plurality of sub-pixel regions 000a in the liquid crystal display panel 000, and the sub-pixel region 000a has four boundaries. For example, any two adjacent first signal lines 101 and any two adjacent second signal lines 201 may enclose one sub-pixel region 000a. The liquid crystal display panel 000 may include: a first substrate 100 and a second substrate 200 which are disposed opposite to each other, and a liquid crystal layer 300 and a plurality of strip-shaped spacers 400 disposed between the first substrate 100 and the second substrate 200.

The strip-shaped spacer 400 extends along one boundary of the sub-pixel region 000a.

There is an overlapping area between the orthographic projection of the first signal line 101 on a target base and the orthographic projection of the second signal line 201 on the target base. The orthographic projection of the strip-shaped spacer 400 on the target base is not overlapped with the overlapping area. That is, the orthographic projection of the strip-shaped spacer 400 on the target base overlaps with the orthographic projection of one of the first signal line 101 and the second signal line 201 on the target base, and does no overlap with the orthographic projection of the other one of the first signal line 101 and the second signal line 201 on the target base.

The target base may be a base in one of the first substrate 100 and the second substrate 200. For example, the first substrate 100 may include a first base 103, and the plurality of first signal lines 101 disposed on the first base 103, and the second substrate 200 may include a second base 202, and the plurality of second signal lines 201 disposed on the second base 202. Here, one of the first base 103 and the second base 202 may be the target base.

In the embodiment of the present disclosure, the orthographic projection of the strip-shaped spacer 400 on the target base is not overlapped with the overlapping area between orthographic projection of the first signal line 101 on the target base and the orthographic projection of the second signal line 102 on the target base. Therefore, there is only one layer of signal lines at the position of the strip-shaped spacer 400, so that the thickness of the strip-shaped spacer 400 between the first substrate 100 and the second substrate 200 is relatively flat. In addition, since the contact area between the strip-shaped spacer 400 and the first substrate 100, and the contact area between the strip-shaped spacer 400 and the second substrate 200 are relatively large, the strip-shaped spacer 400 has stronger pressure resistance. Therefore, the effect of supporting the first substrate 100 and the second substrate 200 by the strip-shaped spacer 400 is better.

In summary, the liquid crystal display panel according to the embodiment of the present disclosure includes: a first substrate and a second substrate arranged opposite to each other, and a liquid crystal layer and a plurality of stripe-shaped spacers disposed between the first substrate and the second substrate. Since orthographic projections of the plurality of strip-shaped spacers on the target base is not overlapped with the overlapping area between the orthographic projection of the first signal line on the target base and the orthographic projection of the second signal line on the target base, there is only one layer of signal lines at the position of the strip-shaped spacer in the liquid crystal display panel, so that the thickness of the strip-shaped spacer between the first substrate and the second substrate is relatively flat. In addition, the contact area between the strip-shaped spacer and the first substrate and the contact area between the strip-shaped spacer and the second substrate are relatively large, so that the strip-shaped spacer has stronger pressure resistance. In this way, the strip-shaped spacer has a better effect in supporting the first substrate and the second substrate, which improves the pressure resistance of the liquid crystal display panel, thereby effectively reducing the probability that the arrangement of the liquid crystal molecules in the liquid crystal layer changes, and improving the display effect of the liquid crystal display panel.

Figure 9:
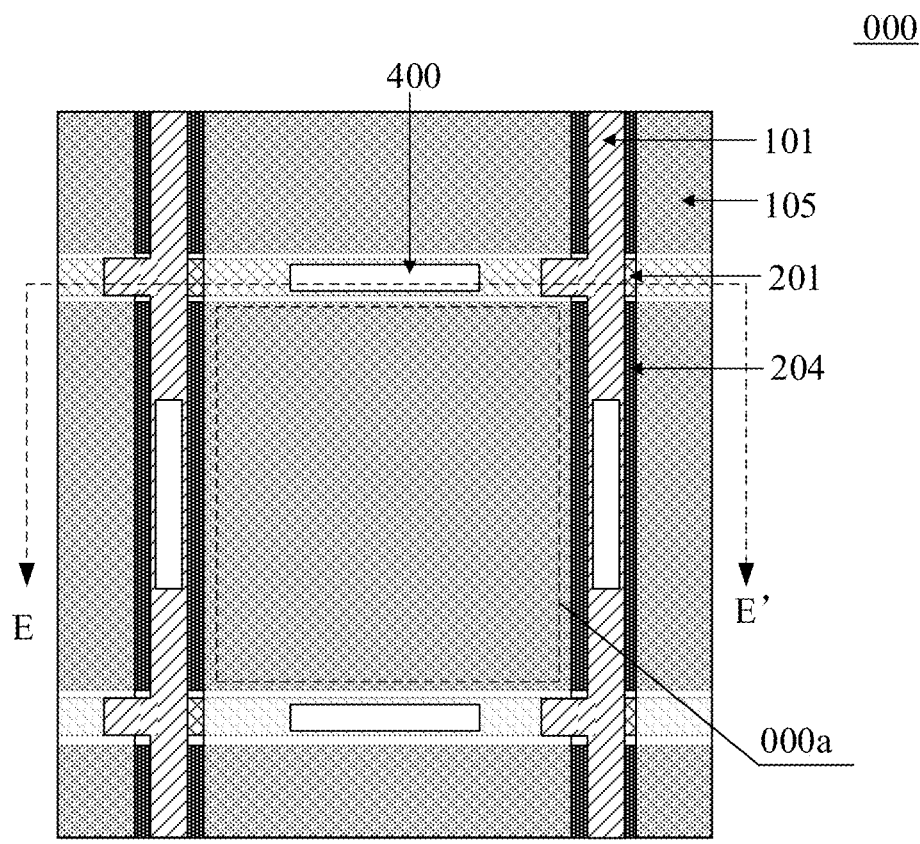
FIG. 9 is a top view of another liquid crystal display panel according to an embodiment of the present disclosure.
Figure 10:
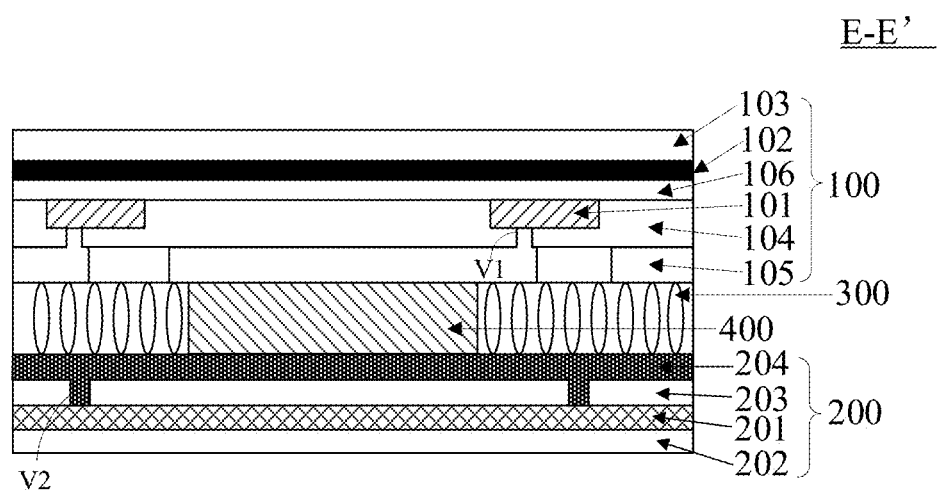
FIG. 10 is a cross-sectional view at E-E' of the liquid crystal display panel shown in FIG. 9.

In embodiments of the present disclosure, referring to FIG. 9 and FIG. 10, FIG. 9 is a top view of another liquid crystal display panel according to an embodiment of the present disclosure, and FIG. 10 is a cross-sectional view at E-E' of the liquid crystal display panel shown in FIG. 9. The plurality of strip-shaped spacers 400 may include four strip-shaped spacers 400 corresponding to four boundaries of the sub-pixel region 000a, and each strip-shaped spacer 100 extends along a corresponding boundary of the sub-pixel region 000a. In some embodiments, there are four strip-shaped spacers corresponding to four boundaries of each sub-pixel region 000a. In this way, the contact area between the strip-shaped spacers 400 and the first substrate 100 and the contact area between the strip-shaped spacers 400 and the second substrate 200 are further increased, and the pressure resistance of the liquid crystal display panel is improved.

In the present disclosure, one strip-shaped spacer 400 is disposed between any two adjacent sub-pixel regions 000a In this case, the arrangement of the plurality of strip-shaped spacers 400 between the first substrate 100 and the second substrate 200 can be simplified, thereby simplifying the process of preparing the strip-shaped spacers 400.

In some embodiments, the shape of the orthographic projection of the strip-shaped spacer 400 on the target base may be a rectangle or an ellipse. When the shape of the orthographic projection of the strip-shaped spacer 400 on the target base is a rectangle, the long side of the rectangle is parallel to the corresponding boundary of the sub-pixel region 000a. When the shape of the orthographic projection of the strip-shaped spacer 400 on the target base is an ellipse, the major axis of the ellipse is parallel to the corresponding boundary of the sub-pixel region 000a.

In the present disclosure, the extending length of the strip-shaped spacer 400 ranges from one-third to one-half of the length of the corresponding boundary of the sub-pixel region 000a. In this way, it is ensured that when liquid crystal is poured between the first substrate 100 and the second substrate 200, liquid crystal molecules may enter each sub-pixel region 000a.

Optionally, the length of each strip-shaped spacer 400 between the first substrate 100 and the second substrate 200 is the same. In this way, it is ensured that the liquid crystal filled in each sub-pixel region 000a is evenly distributed, which further improves the display effect of the liquid crystal display panel.

Figure 11:
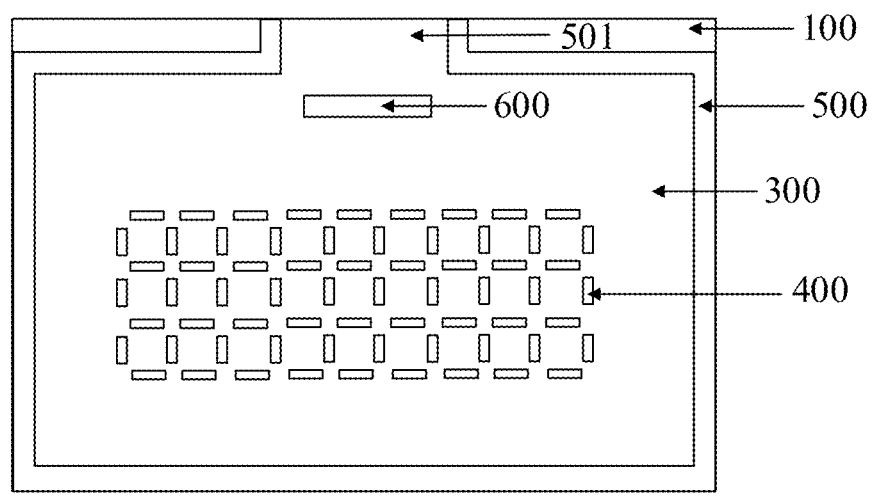
FIG. 11 is a top view of a substrate in the liquid crystal display panel shown in FIG. 9.

In the embodiments of the present disclosure, referring to FIG. 11, FIG. 11 is a top view of a substrate in the liquid crystal display panel shown in FIG. 9. The liquid crystal display panel 000 may further include: a sealant frame 500 and a strip-shaped barrier 600 disposed between the first substrate 100 and the second substrate 200. The sealant frame 500 includes a liquid crystal inlet 501. The strip-shaped spacer 400, the liquid crystal layer 300 and the strip-shaped barrier 600 in the liquid crystal display panel 000 are all disposed in the area enclosed by the sealant frame 500, and the strip-shaped barrier 600 is disposed close to the liquid crystal inlet 501. In this way, when the liquid crystal is poured into the liquid crystal display panel 000 through the liquid crystal inlet 501, the strip-shaped barrier 600 can reduce the speed of the poured liquid crystal flow and change the flowing direction of the poured liquid crystal flow, so that the poured liquid crystal flow flows evenly into the sealant frame 500 from both sides of the strip-shaped barrier 600. Therefore, the impact of the liquid crystal flow on film layers on the substrate is reduced, the probability of filling bubbles occurring when the liquid crystal is poured is reduced, and the yield of the liquid crystal display panel is improved.

In some embodiments, as shown in FIG. 11, the extending direction of the strip-shaped barrier 600 is parallel to the direction of the opening surface of the liquid crystal inlet 501 in the sealant frame 500, and the extending length of the strip-shaped barrier 600 is less than the width of the liquid crystal inlet 501. In this way, it is ensured that the liquid crystal molecules are poured into the sealant frame 500 smoothly.

It should be noted that, the strip-shaped barrier 600 and the strip-shaped spacer 400 are arranged in the same layer and made from the same material. That is, the strip-shaped barrier 600 and the strip-shaped spacer 400 are formed by a one-time patterning process, which may include: photoresist coating, exposure, development, etching, and photoresist stripping.

Figure 12:
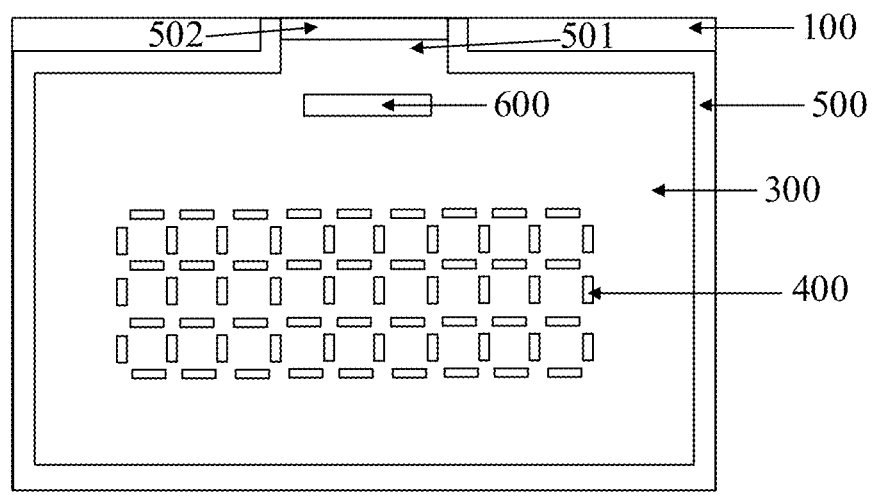
FIG. 12 is a top view of another substrate according to an embodiment of the present disclosure.

In the embodiments of the present disclosure, referring to FIG. 12, FIG. 12 is a top view of another substrate according to an embodiment of the present disclosure. The liquid crystal display panel 000 may further include a sealing strip 502 connected to the sealant frame 500, and the sealing strip 502 is configured to seal the liquid crystal inlet 501. For example, by sealing the liquid crystal inlet 501 with the sealing strip 502 after the liquid crystal is poured into the sealant frame 500 through the liquid crystal inlet 501, the liquid crystal may be prevented from flowing out of the liquid crystal display panel 000.

In the present disclosure, as shown in FIG. 10, one of the first substrate 100 and the second substrate 200 in the liquid crystal display panel 000 may have a black matrix 102. The embodiment of the present disclosure is illustrated by taking an example in which the black matrix 102 is disposed in the first substrate 100. Orthographic projections of the first signal line 101 and the second signal line 201 on the target base are within the orthographic projection of the black matrix 102 on the target base. Since both of the first signal line 101 and the second signal line 201 are made of a reflective metal material, when the orthographic projections of the first signal line 101 and the second signal line 201 on the target base are within the orthographic projection of the black matrix 102 on the target base, the black matrix 102 can shield the first signal line 101 and the second signal line 102, so as to avoid the problem of the poor display effect of the liquid crystal display panel due to reflection of ambient light by the first signal line 101 and the second signal line 102.

In the embodiment of the present disclosure, the orthographic projection of the strip-shaped spacer 400 on the target base is within the orthographic projection of the black matrix 102 on the target base. For example, the width of the strip-shaped spacer 400 may be 6 μm, and the width of the black matrix 102 may be 6.5 μm. Since the arrangement of liquid crystal molecules in the liquid crystal layer 300 disposed near the strip-shaped spacer 400 may be disordered, when the orthographic projection of the strip-shaped spacer 400 on the target base is within the orthographic projection of the black matrix 102 on the target base, the black matrix 102 may shield light reflected by disordered liquid crystal molecules near the strip-shaped spacer 400, which can improve the contrast of the liquid crystal display panel 000, and improve the display effect of the liquid crystal display panel 000.

Optionally, the strip-shaped spacer 400 in the liquid crystal display panel 000 is fixedly connected to the substrate including the black matrix 102. In some embodiments, when the black matrix 102 is integrated in the first substrate 100, the strip-shaped spacers 400 are fixedly connected to the first substrate 100, that is, the strip-shaped spacers 400 are formed on the first substrate 100. In this case, when the display panel is not pressed, the strip-shaped spacer 400 does not contact the second substrate 200; and when the display panel is pressed, the strip-shaped spacer 400 may contact the second substrate 200, so that the strip-shaped spacer 400 may support the first substrate 100 and the second substrate 200.

In the embodiment of the present disclosure, the liquid crystal display panel 000 may be an actively driven liquid crystal display panel or a passively driven liquid crystal display panel.

When the liquid crystal display panel 000 is an actively driven liquid crystal display panel, both of the first signal line 101 and the second signal line 201 in the liquid crystal display panel 000 may be disposed in the same substrate, for example, both of the first signal line 101 and the second signal line 201 may be disposed in the first substrate.

In this case, the first substrate may be referred to as an array substrate. The first substrate may further include: a thin film transistor (TFT) and a pixel electrode. The first signal line 101 is electrically connected to one of a source and a drain of the TFT, the second signal line 201 is electrically connected to a gate of the TFT, and the pixel electrode is electrically connected to the other of the source and the drain of the TFT. The second substrate may include: a black matrix and a common electrode.

When the liquid crystal display panel 000 is a passively driven liquid crystal display panel, the first signal line 101 and the second signal line 201 are respectively disposed in the first substrate 100 and the second substrate 200 which are disposed opposite to each other.

Figure 13:
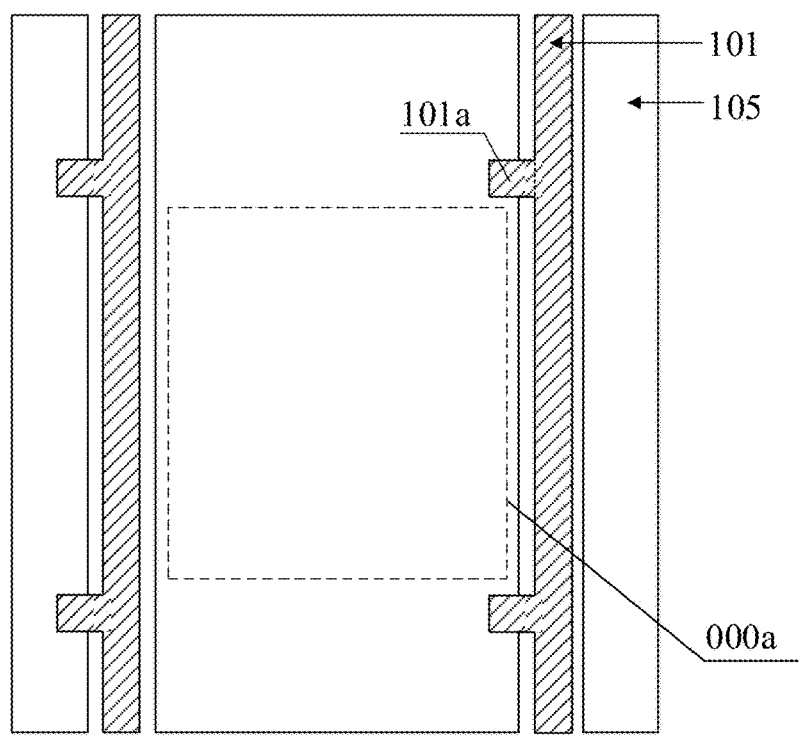
FIG. 13 is a top view of a first substrate in the liquid crystal display panel shown in FIG. 9.

For the structure of the first substrate 100, referring to FIG. 9, FIG. 10 and FIG. 13, FIG. 13 is a top view of the first substrate of the liquid crystal display panel shown in FIG. 9. The first substrate 100 in the liquid crystal display panel 000 may further include: a first base 103, and the plurality of first signal lines 101, a first insulating layer 104 and a plurality of first strip-shaped electrodes 105 disposed on the first base 103 and stacked in a direction perpendicular to and going away from the first base 103. The plurality of first signal lines 101 are electrically connected in one-to-one correspondence to the plurality of first strip-shaped electrodes 105, and the extending direction of the first signal line 101 is parallel to the extending direction of a corresponding first strip-shaped electrode 105.

For example, the first signal line 101 includes a plurality of first connecting portions 101a, the first insulating layer 104 includes a plurality of first vias V1 in one-to-one correspondence with the plurality of first connecting portions 101a. The first connecting portion 101a may be electrically connected to the corresponding first strip-shaped electrode 105 through a corresponding first via V1. In this way, the first signal line 101 may be electrically connected to the corresponding first strip-shaped electrode 105 through the plurality of first connecting portions 101a. Since the material of the first strip-shaped electrode 105 may be a transparent conductive material such as indium tin oxide (ITO) or indium zinc oxide (IZO) with a relatively large resistance, when the first signal line 101 is electrically connected to the corresponding first strip-shaped electrode 105 through the plurality of first connecting portions 101a, the first signal line 101 may apply electrical signals to the first strip-shaped electrode 105 at multiple positions, so that the electrical signals applied on the first strip-shaped electrode 105 have the same voltage at different positions.

When the black matrix 102 is integrated in the first substrate 100, the black matrix 102 may be disposed between the first base 103 and the first signal line 101. In addition, since the black matrix 102 also has certain conductivity, the black matrix 102 and the first signal line 101 needs to be insulated from each other by a third insulating layer 106.

Figure 14:
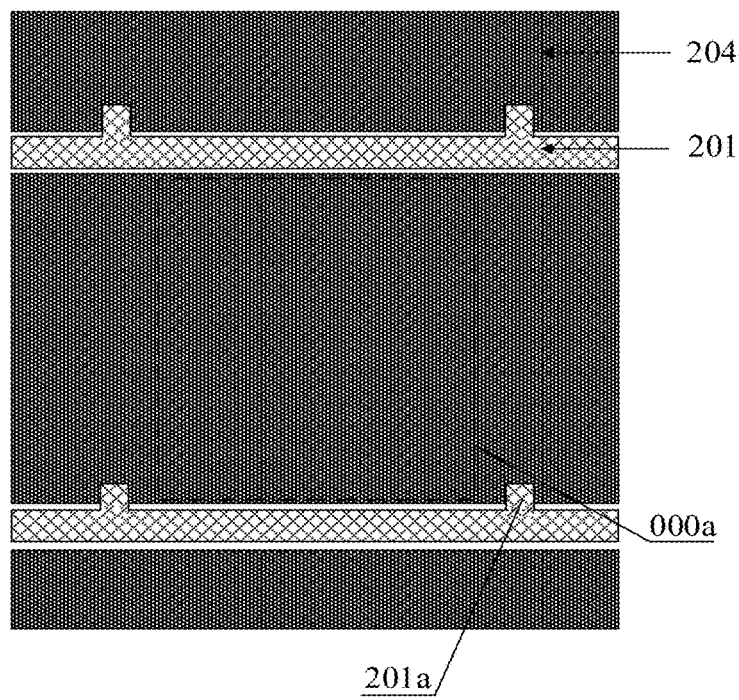
FIG. 14 is a top view of a second substrate in the liquid crystal display panel shown in FIG. 9.

For the structure of the second substrate 200, referring to FIG. 9, FIG. 10 and FIG. 14, FIG. 14 is a top view of the second substrate of the liquid crystal display panel shown in FIG. 9. The second substrate 200 in the liquid crystal display panel 000 may further include: a second base 202, and the plurality of second signal lines 201, a second insulating layer 203 and a plurality of second strip-shaped electrodes 204 disposed on the second base 202 and stacked in a direction perpendicular to and going away from the second base 202. The plurality of second signal lines 201 are electrically connected in one-to-one correspondence to the plurality of second strip-shaped electrodes 204, and the extending direction of the second signal line 201 is parallel to the extending direction of a corresponding second strip-shaped electrode 204.

In some embodiments, the second signal line 201 includes a plurality of second connecting portions 201a, and the second insulating layer 203 includes a plurality of second vias 203a in one-to-one correspondence with the plurality of second connecting portions 201a. The second connecting portion 201a may be electrically connected to the corresponding second strip-shaped electrode 204 through a corresponding second via 203a. In this way, the second signal line 201 may be electrically connected to the corresponding second strip-shaped electrode 204 through the plurality of second connecting portions 203a. Since the material of the second strip-shaped electrode 204 may be a transparent conductive material such as ITO or IZO with a relatively large resistance, when the second signal line 201 is electrically connected to the corresponding second strip-shaped electrode 204 through the plurality of second connecting portions 203a, the second signal line 201 may apply electrical signals to the second strip-shaped electrode 204 at multiple positions, so that the electrical signals applied on the second strip-shaped electrode 204 have the same voltage at different positions.

In the embodiment of the present disclosure, the extending direction of the first strip-shaped electrode 105 is perpendicular to the extending direction of the second strip-shaped electrode 204. It should be noted that the area where the orthographic projections of the first strip-shaped electrode 105 and the second strip-shaped electrode 204 on the target base overlap is the sub-pixel region 000a.

Optionally, when the liquid crystal display panel 000 is a passively driven liquid crystal display panel, the liquid crystal layer 300 in the liquid crystal display panel 000 may include: bistable cholesteric liquid crystal molecules. In this case, the display function may be realized by reflection of ambient light by the bistable cholesteric liquid crystal molecules.

In summary, the liquid crystal display panel according to the embodiment of the present disclosure includes: a first substrate and a second substrate arranged opposite to each other, and a liquid crystal layer and a plurality of stripe-shaped spacers disposed between the first substrate and the second substrate. Since the orthographic projections of the plurality of strip-shaped spacers on the target base is not overlapped with the overlapping area between the orthographic projections of the first signal line and the second signal line on the target base, there is only one layer of signal lines at the position of the strip-shaped spacer in the liquid crystal display panel, so that the thickness of the strip-shaped spacer between the first substrate and the second substrate is relatively uniform. In addition, the contact area between the strip-shaped spacer and the first substrate and the contact area between the strip-shaped spacer and the second substrate are relatively large, so that the strip-shaped spacer has stronger pressure resistance. In this way, the strip-shaped spacer has a better effect of supporting the first substrate and the second substrate, which improves the pressure resistance of the liquid crystal display panel, thereby effectively reducing the probability that the arrangement of the liquid crystal molecules in the liquid crystal layer changes, and improving the display effect of the liquid crystal display panel.

Figure 15:
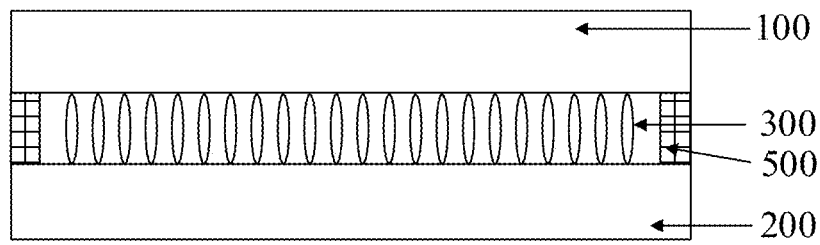
FIG. 15 is a schematic diagram of a film layer structure of a liquid crystal display panel according to another embodiment of the present disclosure.
Figure 16:
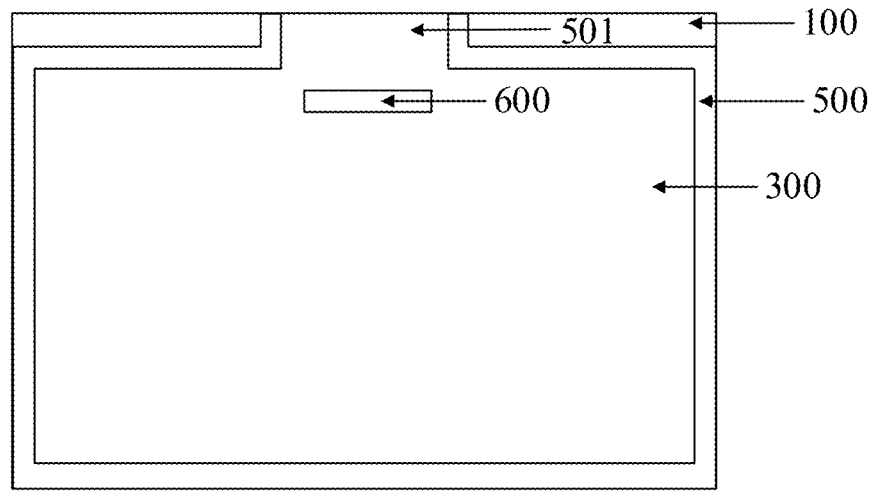
FIG. 16 is a top view of a substrate in the liquid crystal display panel shown in FIG. 15.

Referring to FIG. 15 and FIG. 16, FIG. 15 is a schematic diagram of a film layer structure of a liquid crystal display panel according to another embodiment of the present disclosure, and FIG. 16 is a top view of a substrate in the liquid crystal display panel shown in FIG. 15. The liquid crystal display panel 000 may include: a first substrate 100 and a second substrate 200 disposed opposite to each other, and a liquid crystal layer 300, a sealant frame 500, and a strip-shaped barrier 600 disposed between the first substrate 100 and the second substrate 200.

The sealant frame 500 includes a liquid crystal inlet 501, the liquid crystal layer 300 and the strip-shaped barrier 600 are disposed in the area enclosed by the sealant frame 500, and the strip-shaped barrier 600 is disposed close to the liquid crystal inlet 501.

In summary, the liquid crystal display panel according to the embodiment of the present disclosure includes: a first substrate and a second substrate disposed opposite to each other, and a liquid crystal layer, a sealant frame, and a strip-shaped barrier disposed between the first substrate and the second substrate. The strip-shaped barrier is disposed in the sealant frame and close to the liquid crystal inlet in the sealant frame. In this way, when the liquid crystal is poured into the liquid crystal display panel through the liquid crystal inlet, the strip-shaped barrier may reduce the speed of the poured liquid crystal flow and change the flowing direction of the poured liquid crystal flow, so that the poured liquid crystal flow flows evenly into the sealant frame 500 from both sides of the strip-shaped barrier. Therefore, the impact of the liquid crystal flow on the film layer of the substrate is reduced, the probability of poor bubbles occurring when the liquid crystal is poured is reduced, and the yield of the liquid crystal display panel is improved.

Figure 17:
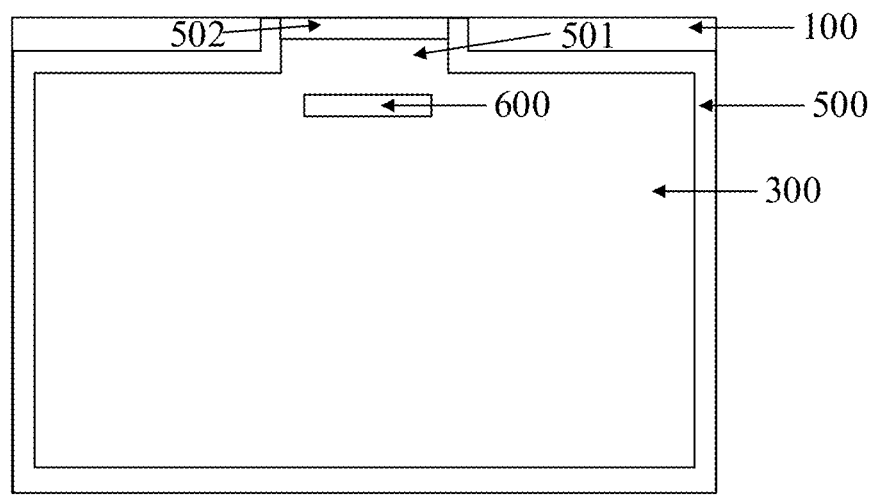
FIG. 17 is a top view of another substrate according to another embodiment of the present disclosure.

In some embodiments, referring to FIG. 17, FIG. 17 is a top view of another substrate according to another embodiment of the present disclosure. The liquid crystal display panel 000 may further include: a sealing strip 502 connected to the sealant frame 500. The sealing strip 502 is configured to seal the liquid crystal inlet 501. For example, by sealing the liquid crystal inlet 501 with the sealing strip 502 after the liquid crystal is poured into the sealant frame 500 through the liquid crystal inlet 501, the liquid crystal can be prevented from flowing out of the liquid crystal display panel 000.

Optionally, the strip-shaped barrier 600 extends along the direction in which the opening surface of the liquid crystal inlet 501 is arranged.

Optionally, the extending length of the strip-shaped barrier 600 is less than the width of the liquid crystal inlet 501.

The embodiments of the present disclosure further provide a method for manufacturing a liquid crystal display panel. The method for manufacturing a liquid crystal display panel is applied to manufacture the liquid crystal display panel shown in FIG. 9. The method for manufacturing the liquid crystal display panel may include the following steps.

In step A, a black matrix, a third insulating layer, a plurality of first signal lines, a first insulating layer, and a plurality of first strip-shaped electrodes are formed on a first base to obtain a first substrate.

For example, a black matrix material film is first formed on the first base, and a one-time patterning process is performed on the black matrix material film to form the black matrix. Next, a third insulating layer is formed on the first base formed with the black matrix. Then, a first conductive film may be formed on the third insulating layer, and a one-time patterning process may be performed on the first conductive film to form the plurality of first signal lines. Afterwards, a first insulating film is formed on the first base formed with the plurality of first signal lines, and a one-time patterning process is performed on the first insulating film to form the first insulating layer. Optionally, the material of the first insulating layer may include silicon dioxide, silicon nitride, or a mixed material of silicon dioxide and silicon nitride. Finally, a second conductive film is formed on the first base formed with the first insulating layer, and a one-time patterning process is performed on the second conductive film to form the plurality of first strip-shaped electrodes. Optionally, the material of the plurality of first strip-shaped electrodes may include: ITO or IZO.

It should be noted that the first substrate may be formed through the above processes. It should also be noted that the one-time patterning process in the above embodiment may include: photoresist coating, exposure, development, etching, and photoresist stripping.

In step B, a strip-shaped barrier, a plurality of strip-shaped spacers and a sealant frame are formed on the first substrate.

For example, an organic film is first formed on the plurality of first strip-shaped electrodes in the first substrate, and a one-time patterning process is performed on the organic film to form the strip-shaped barrier and the plurality of strip-shaped spacers. Then, a sealant frame material is coated at peripheral edges of the first substrate formed with the strip-shaped barrier and the plurality of strip-shaped spacers, to form a sealant frame with a liquid crystal inlet. The strip-shaped barrier and the plurality of strip-shaped spacers are disposed in the area enclosed by the sealant frame, and the strip-shaped barrier is disposed close to the liquid crystal inlet.

In step C, a plurality of second signal lines, a second insulating layer and a plurality of second strip-shaped electrodes are formed on a second base to obtain a second substrate.

For example, a third conductive film is first formed on the second base, and a one-time patterning process is performed on the third conductive film to form the plurality of second signal lines. Then, a second insulating film is formed on the second base formed with the plurality of second signal lines, and a one-time patterning process is performed on the second insulating film to form the second insulating layer. Optionally, the material of the second insulating layer may include silicon dioxide, silicon nitride, or a mixed material of silicon dioxide and silicon nitride. Finally, a fourth conductive film is formed on the second base formed with the second insulating layer, and a one-time patterning process is performed on the fourth conductive film to form the plurality of second strip-shaped electrodes. Optionally, the material of the plurality of second strip-shaped electrodes may include: ITO or IZO.

It should be noted that the second substrate may be formed through the above processes. It should also be noted that the one-time patterning process in the above embodiment may include: photoresist coating, exposure, development, etching, and photoresist stripping.

In step D, the first substrate and the second substrate are disposed opposite to each other, so that the plurality of first strip-shaped electrodes in the first substrate face the plurality of second strip-shaped electrodes in the second substrate.

In some embodiments, after the first substrate and the second substrate are disposed opposite to each other, the extending direction of the first strip-shaped electrode is perpendicular to the extending direction of the second strip-shaped electrode.

In step E, liquid crystal is poured into the sealant frame to form a liquid crystal layer.

In some embodiments, the liquid crystal is poured through the liquid crystal inlet of the sealant frame to form the liquid crystal layer.

In step F, a sealing strip is formed at the liquid crystal inlet in the sealant frame.

In some embodiments, after the liquid crystal is poured into the sealant frame through the liquid crystal inlet, the liquid crystal inlet is sealed with the sealing strip, to prevent the liquid crystal from flowing out of the liquid crystal display panel.

Embodiments of the present disclosure further provide an electronic paper, which may include the above-mentioned liquid crystal display panel. The electronic paper may be a display component of a handwriting board, an electronic book, an education blackboard or the like.

It should be noted that in the drawings, the dimensions of the layers and areas may be exaggerated for the clarity of the drawings. It can be understood that when an element or layer is disposed "on" another element or layer, the element or layer may be directly disposed on the another element, or there may be an intermediate layer. Further, it can be understood that when an element or layer is disposed "under" another element or layer, the element or layer may be directly disposed under the another element, or there may be at least one intermediate layer or element. Further, it can be understood that when an element or layer is disposed "between" two layers or two elements, the element or layer may be the only one between the two layers or two elements, or there may be at least one intermediate layer or element. Similar reference signs refer to similar elements throughout the whole text.

In the present disclosure, the terms "first" and "second" are merely used for descriptive purposes, and cannot be understood as indicating or implying relative importance. The term "a plurality of" refers to two or more, unless specifically defined otherwise.

Described above are merely optional embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A liquid crystal display panel, comprising a plurality of first signal lines and a plurality of second signal lines, wherein the plurality of first signal lines and the plurality of second signal lines are arranged to intersect, the plurality of first signal lines and the plurality of second signal lines are configured to define a plurality of sub-pixel regions on the liquid crystal display panel, the sub-pixel region comprising four boundaries; the liquid crystal display panel comprising:
   a first substrate and a second substrate disposed opposite to each other; and
   a liquid crystal layer and a plurality of strip-shaped spacers disposed between the first substrate and the second substrate, the strip-shaped spacer extending along one boundary of the sub-pixel region,
   wherein there is an overlapping area between an orthographic projection of the first signal line on a target base and an orthographic projection of the second signal line on the target base, an orthographic projection of the strip-shaped spacer on the target base overlaps with a non-overlapped area between the orthographic projection of the first signal line on the target base and the orthographic projection of the second signal line on the target base, and the target base is a base of one of the first substrate and the second substrate;
   wherein the first substrate comprises: a first base, and the plurality of first signal lines, a first insulating layer and a plurality of first strip-shaped electrodes disposed on the first base and stacked in a direction perpendicular to and going away from the first base, wherein an extending direction of the first signal line is parallel to an extending direction of a corresponding first strip-shaped electrode; and
   wherein the second substrate comprises: a second base, and the plurality of second signal lines, a second insulating layer and a plurality of second strip-shaped electrodes disposed on the second base and stacked in a direction perpendicular to and going away from the second base, wherein an extending direction of the second signal line is parallel to an extending direction of a corresponding second strip-shaped electrode.

2. The liquid crystal display panel according to claim 1, wherein the plurality of strip-shaped spacers comprises: four strip-shaped spacers corresponding to the four boundaries of the sub-pixel region, and the strip-shaped spacer extends along a corresponding boundary of the sub-pixel region.

3. The liquid crystal display panel according to claim 2, wherein one strip-shaped spacer is disposed between any two adjacent sub-pixel regions.

4. The liquid crystal display panel according to claim 3, wherein a length of the strip-shaped spacer ranges from one-third to one-half of a length of the corresponding boundary of the sub-pixel region.

5. The liquid crystal display panel according to claim 1, further comprising: a sealant frame and a strip-shaped barrier disposed between the first substrate and the second substrate,
   wherein the sealant frame comprises a liquid crystal inlet, the strip-shaped barrier, the liquid crystal layer and the strip-shaped spacer are all disposed in an area enclosed by the sealant frame, and the strip-shaped barrier is disposed close to the liquid crystal inlet.

6. The liquid crystal display panel according to claim 5, further comprising: a sealing strip connected to the sealant frame, the sealing strip being configured to seal the liquid crystal inlet.

7. The liquid crystal display panel according to claim 6, wherein an extending direction of the strip-shaped barrier is parallel to an opening surface of the liquid crystal inlet.

8. The liquid crystal display panel according to claim 7, wherein an extending length of the strip-shaped barrier is less than a width of the liquid crystal inlet.

9. The liquid crystal display panel according to claim 5, wherein the strip-shaped barrier and the strip-shaped spacer are disposed in a same layer and made of a same material.

10. The liquid crystal display panel according to claim 1, wherein one of the first substrate and the second substrate comprises a black matrix, and the orthographic projection of the strip-shaped spacer on the target base is within an orthographic projection of the black matrix on the target base.

11. The liquid crystal display panel according to claim 10, wherein the strip-shaped spacer is fixedly connected to the substrate comprising the black matrix.

12. The liquid crystal display panel according to claim 1, wherein the plurality of first signal lines are electrically connected in one-to-one correspondence to the plurality of first strip-shaped electrodes.

13. The liquid crystal display panel according to claim 12, wherein the first signal line comprises a plurality of first connecting portions, the first insulating layer comprises a plurality of first vias in one-to-one correspondence with the plurality of first connecting portions, and the first connecting portion is electrically connected to a corresponding first strip-shaped electrode through a corresponding first via.

14. The liquid crystal display panel according to claim 12, wherein the plurality of second signal lines are electrically connected in one-to-one correspondence to the plurality of second strip-shaped electrodes.

15. The liquid crystal display panel according to claim 14, wherein the second signal line comprises a plurality of second connecting portions, the second insulating layer comprises a plurality of second vias in one-to-one correspondence with the plurality of second connecting portions, and the second connecting portion is electrically connected to a corresponding second strip-shaped electrode through a corresponding second via.

16. The liquid crystal display panel according to claim 14, wherein the extending direction of the first strip-shaped electrode is perpendicular to the extending direction of the second strip-shaped electrode.

17. The liquid crystal display panel according to claim 14, wherein the liquid crystal layer comprises: bistable cholesteric liquid crystal molecules.

18. A liquid crystal display panel, comprising:
   a first substrate and a second substrate disposed opposite to each other; and
   a liquid crystal layer, a sealant frame, and a strip-shaped barrier disposed between the first substrate and the second substrate,
   wherein the sealant frame comprises a liquid crystal inlet, the liquid crystal layer and the strip-shaped barrier are disposed in an area enclosed by the sealant frame, and the strip-shaped barrier is disposed close to the liquid crystal inlet;
   wherein the first substrate comprises: a first base, and the plurality of first signal lines, a first insulating layer and a plurality of first strip-shaped electrodes disposed on the first base and stacked in a direction perpendicular to and going away from the first base, wherein an extending direction of the first signal line is parallel to an extending direction of a corresponding first strip-shaped electrode; and
   wherein the second substrate comprises: a second base, and the plurality of second signal lines, a second insulating layer and a plurality of second strip-shaped electrodes disposed on the second base and stacked in a direction perpendicular to and going away from the second base, wherein an extending direction of the second signal line is parallel to an extending direction of a corresponding second strip-shaped electrode.

19. The liquid crystal display panel according to claim 18, further comprising: a sealing strip connected to the sealant frame, the sealing strip being configured to seal the liquid crystal inlet.

20. An electronic paper, comprising: a power supply component and a liquid crystal display panel, the power supply component being configured to supply power to the liquid crystal display panel, wherein:
   the liquid crystal display panel comprises: a plurality of first signal lines and a plurality of second signal lines, wherein the plurality of first signal lines and the plurality of second signal lines are arranged to intersect, the plurality of first signal lines and the plurality of second signal lines are configured to define a plurality of sub-pixel regions in the liquid crystal display panel, the sub-pixel region comprising four boundaries; and
   the liquid crystal display panel comprises:
   a first substrate and a second substrate disposed opposite to each other; and
   a liquid crystal layer and a plurality of strip-shaped spacers disposed between the first substrate and the second substrate, the strip-shaped spacer extending along one boundary of the sub-pixel region,
   wherein there is an overlapping area between an orthographic projection of the first signal line on a target base and an orthographic projection of the second signal line on the target base, an orthographic projection of the strip-shaped spacer on the target base overlaps with a non-overlapped area between the orthographic projection of the first signal line on the target base and the orthographic projection of the second signal line on the target base, and the target base is a base of one of the first substrate and the second substrate;
   wherein the first substrate comprises: a first base, and the plurality of first signal lines, a first insulating layer and a plurality of first strip-shaped electrodes disposed on the first base and stacked in a direction perpendicular to and going away from the first base, wherein an extending direction of the first signal line is parallel to an extending direction of a corresponding first strip-shaped electrode; and
   wherein the second substrate comprises: a second base, and the plurality of second signal lines, a second insulating layer and a plurality of second strip-shaped electrodes disposed on the second base and stacked in a direction perpendicular to and going away from the second base, wherein an extending direction of the second signal line is parallel to an extending direction of a corresponding second strip-shaped electrode.

* * * * *